United States Patent Office 2,957,821
Patented Oct. 25, 1960

2,957,821

METHOD OF SEPARATING ALUMINA PARTICLES FROM AQUEOUS ACID ALUMINA SLURRY

Leo M. Schifferli, Jr., Kokomo, Ind., assignor to Union Carbide Corporation, a corporation of New York No Drawing. Filed Sept. 5, 1958, Ser. No. 759,151

8 Claims. (Cl. 210—54)

This invention pertains to a method of separating a finely-divided, highly-dispersed slurry containing finely-ground alumina.

In the making of articles from metal ceramics, for example the chromium-alumina type, alumina of an extremely-fine particle size of the order of less than 2 microns is required for ceramic slips. Alumina particles in this size range are generally produced by grinding alumina in steel ball mills. During this grinding operation the alumina often becomes contaminated with metallic iron. The removal of this contaminant is conventionally accomplished by acid leaching. In the leaching operation a range of pH is reached in which the particles deflocculate and form a fine suspension. The dispersion is so complete that it has heretofore been found virtually impossible to filter this suspension with any of the known commercial devices. The finely-divided, highly-dispersed alumina particles plug the filter medium and render it useless.

The purpose of the present invention is to provide a method whereby the separation of certain fine particles from a solid-liquid suspension can be effected and readily adapted to commercial production.

In accordance with this invention, a finely-divided, highly-dispersed, aqueous, acidic, alumina slurry is flocculted by the addition of at least one agent from the group consisting of monoethanolamine, ammonium hydroxide or a compound in the class of the organic amines and bases. The flocculating agent is utilized to impart to the alumina slurry a basicity of from about 7 to 10 pH. The flocculated alumina suspension is then centrifuged and excellent separation of the alumina from the water is achieved. The alumina cakes retrieved in this manner are then dried and may be repulped satisfactorily and formed into a slip for subsequent casting operations.

Although a basicity within the range of from 7 to 10 pH causes sufficient flocculating of the slurry, a pH factor of between about 8 and 9 is preferred. The centrifuging step is necessary since the cream-like suspension formed by the addition of the flocculating agent does not settle satisfactorily by gravity. The preferred flocculating agent is monoethanolamine which has neutralization products that are completely volatile and are not retained by the settled alumina as a contaminant. However, ammonium hydroxide as well as ethyl amine, di- and tri-ethanolamine and 2-aminopropanol have been utilized effectively in the practice of the process of the invention.

It is not certain why the close control of the pH is essential to the separation. It is believed, however, that in an acid solution the alumina particles tend to adsorb an electrical charge which causes the particles to repel each other. When the solution is neutralized, the absorbed layer is destroyed, thereby permitting the particles to agglomerate leaving them more susceptible to separation by centrifugal force.

In an example of the present invention, one gallon of an alumina slurry which was milk-like and water-thin, having a pH of about 3.7 and a solids content of from 20 to 25 percent, was modified by the addition of monoethanolamine to raise the pH to about 8.5. The consistency of the slurry was thereby altered to that of cream. This flocculated alumina suspension was then fed to a small centrifuge and agitated during the feeding period. Excellent separation was effected within a short time and the alumina cakes were removed periodically from the centrifuge, being easily separated from the supernatent liquid. The gallon of slurry yielded 2.79 pounds of alumina. The alumina cakes were then fed to a forced convection furnace and dried at 40° C. The product was found to be entirely satisfactory for use in preparing a slip for slip casting operations.

The above experiment was repeated with similar, highly acceptable results, proving the consistency of the flocculating property of the monoethanolamine addition. Slurrys similar to those used in the above experiment were centrifuged without the monoethanolamine addition but such tests proved unsuccessful in separating the solids content. Boiling the unflocculated slurry prior to centrifuging did not appreciably affect the results obtained.

A slurry similar to the ones previously flocculated and having a pH of 4 was treated by centrifugal means without the addition of the flocculating agents. The attempt to separate the alumina particles was unsuccessful.

The present invention makes possible the filtering of slurries which have so far been considered unfilterable and whose stability can be controlled by a variation in pH.

This application is a continuation-in-part of U.S. patent application Serial No. 523,941, filed July 22, 1955, now abandoned.

What is claimed is:

1. The method of separating alumina particles from a suspension of micron size particles of alumina in a highly dispersed, aqueous, acidic alumina slurry, comprising adjusting the basicity of said slurry to a pH of between about 7 to 10, said basicity being adjusted by a flocculating agent, said flocculating agent comprising at least one of the nitrogen containing compounds selected from the group consisting of monoethanolamine, ammonium hydroxide, ethyl amine, di- and tri-ethanolamine and 2-aminopropanol, said flocculating agent effecting the flocculating of said suspension, centrifuging the resulting flocculated suspension to settle said particles of alumina, and drying said particles of alumina for subsequent utilization.

2. A method in accordance with claim 1 wherein the basicity of said slurry is adjusted to a pH of between 8 and 9.

3. The method of separating alumina particles from a suspension of micron size particles of alumina in a highly dispersed, aqueous, acidic alumina slurry, comprising adjusting the basicity of said slurry to a pH of between about 7 to 10, said basicity being adjusted by a flocculating agent, said flocculating agent comprising monoethanolamine, said flocculating agent effecting the flocculation of said suspension, centrifuging the resulting flocculated suspension to settle said particles of alumina, and drying said particles of alumina for subsequent utilization.

4. A method in accordance with claim 3, wherein the basicity of said slurry is adjusted to a pH of between 8 and 9.

5. The method of separating alumina particles from a suspension of micron size particles of alumina in a highly dispersed, aqueous, acidic alumina slurry, comprising adjusting the basicity of said slurry to a pH of between about 7 to 10, said basicity being adjusted by a flocculating agent, said flocculating agent comprising ammonium hydroxide, said flocculating agent effecting the flocculation of said suspension, centrifuging the resulting flocculated suspension to settle said particles of alumina, and drying said particles of alumina for subsequent utilization.

6. A method in accordance with claim 5, wherein the basicity of said slurry is adjusted to a pH of between 8 and 9.

7. The method of separating a finely-divided, highly dispersed, aqueous, acidic slurry containing particles of alumina of a size less than about two microns and having a pH of less than about 4.0, comprising adjusting the basicity of said slurry to a pH of between about 7 to 10, said basicity being adjusted by a flocculating agent, said flocculating agent comprising monoethhanolamine, said monoethanolamine effecting the flocculating of said suspension, centrifuging the resulting flocculated suspension to settle said particles of alumina, and drying said particles of alumina for subsequent utilization.

8. A method in accordance with claim 7, wherein the basicity of said slurry is adjusted to a pH of between 8 and 9.

References Cited in the file of this patent

UNITED STATES PATENTS

| | | |
|---|---|---|
| 2,315,734 | Ralston et al. | Apr. 6, 1943 |
| 2,394,083 | Lintz | Feb. 5, 1946 |
| 2,436,509 | Faust | Feb. 24, 1948 |